US010583838B2

(12) United States Patent
Chang

(10) Patent No.: US 10,583,838 B2
(45) Date of Patent: Mar. 10, 2020

(54) SYSTEMS AND METHODS OF AUTOMATIC BRAKING FOR MANUAL TRANSMISSIONS

(71) Applicant: GM GLOBAL TECHNOLOGY OPERATIONS LLC, Detroit, MI (US)

(72) Inventor: Richard I. Chang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 595 days.

(21) Appl. No.: 15/343,867

(22) Filed: Nov. 4, 2016

(65) Prior Publication Data
US 2018/0126994 A1 May 10, 2018

(51) Int. Cl.
*B60W 30/18* (2012.01)
*B60W 10/02* (2006.01)
(Continued)

(52) U.S. Cl.
CPC ...... *B60W 30/18109* (2013.01); *B60W 10/02* (2013.01); *B60W 10/184* (2013.01);
(Continued)

(58) Field of Classification Search
CPC ............... F16H 2063/426; F16H 63/42; G01S 2013/9346; G01S 2013/9364; G01S 2013/9367; G01S 13/931; G01S 15/931; G01S 17/936; F16D 48/06; F16D 2500/102; F16D 2500/10412; F16D 2500/3067; F16D 2500/3108; F16D 2500/312; F16D 2500/31406; B60W 2420/42; B60W 2420/52; B60W 2420/54; B60W 2510/0638; B60W 2520/10; B60W 2710/021; B60W 2710/182; B60W 30/18109; B60W 10/02; B60W 10/184;
(Continued)

(56) References Cited

U.S. PATENT DOCUMENTS 5,632,706 A * 5/1997 Kremmling ........... B60W 30/18
192/222
6,504,259 B1 * 1/2003 Kuroda .................... B60K 6/46
290/40 C
(Continued)

FOREIGN PATENT DOCUMENTS

CN 104960466 A 10/2015
DE 102014009084 A1 5/2015

*Primary Examiner* — Anthony R Jimenez
(74) *Attorney, Agent, or Firm* — Quinn IP Law

(57) ABSTRACT

Methods and systems for automatic braking for vehicles having a manual transmission are disclosed. An exemplary method includes providing a vehicle with at least one vehicle sensor, at least one actuator, and a controller in communication with the at least one vehicle sensor and the at least one actuator, determining a vehicle speed and an engine speed, receiving sensor data from the at least one vehicle sensor, calculating if the vehicle speed should be reduced based on the sensor data from the at least one vehicle sensor, generating a first control signal if the vehicle speed should be reduced, calculating if the engine speed is below a predetermined idle speed, generating a second control signal if the engine speed is below the predetermined idle speed, and automatically controlling the at least one actuator based on the first and second control signals.

17 Claims, 5 Drawing Sheets

(51) Int. Cl.
*B60W 10/184* (2012.01)
*B60W 50/14* (2020.01)
*F16H 63/42* (2006.01)
*G01S 13/93* (2020.01)
*G01S 15/93* (2020.01)
*G01S 17/93* (2020.01)
*B60R 1/00* (2006.01)
*F16D 48/06* (2006.01)
*G01S 13/931* (2020.01)
*G01S 15/931* (2020.01)

(52) U.S. Cl.
CPC ............ *B60W 50/14* (2013.01); *F16H 63/42* (2013.01); *G01S 13/931* (2013.01); *G01S 15/931* (2013.01); *G01S 17/936* (2013.01); *B60R 1/00* (2013.01); *B60R 2300/10* (2013.01); *B60R 2300/80* (2013.01); *B60T 2270/00* (2013.01); *B60W 2420/42* (2013.01); *B60W 2420/52* (2013.01); *B60W 2420/54* (2013.01); *B60W 2510/0638* (2013.01); *B60W 2520/10* (2013.01); *B60W 2710/021* (2013.01); *B60W 2710/182* (2013.01); *F16D 48/06* (2013.01); *F16D 2500/102* (2013.01); *F16D 2500/10412* (2013.01); *F16D 2500/3067* (2013.01); *F16D 2500/312* (2013.01); *F16D 2500/3108* (2013.01); *F16D 2500/31406* (2013.01); *F16H 2063/426* (2013.01); *G01S 2013/9346* (2013.01); *G01S 2013/9364* (2013.01); *G01S 2013/9367* (2013.01)

(58) Field of Classification Search
CPC ...... B60W 50/14; B60R 1/00; B60R 2300/10; B60R 2300/80; B60T 2270/00
USPC ...................................................... 701/48, 69
See application file for complete search history.

(56) References Cited

U.S. PATENT DOCUMENTS 8,849,507 B2   9/2014   Popp et al.
2009/0204280 A1*  8/2009   Simon, Jr. ................ B60K 6/48
                                                           701/22

* cited by examiner

SYSTEMS AND METHODS OF AUTOMATIC BRAKING FOR MANUAL TRANSMISSIONS

INTRODUCTION

The present invention relates generally to the field of vehicles and, more specifically, to automatic emergency braking for manual transmission vehicles.

Manual transmissions include a plurality of gears and associated components that are manipulated to drive an output shaft using different gear ratios. Via the gear shift lever, the operator provides input to indicate a desired up-shift or down-shift. However, during situations in which a quick reduction in vehicle speed is desired, if a high transmission gear is selected, the sudden reduction in engine speed results in an undesirable engine stall event.

SUMMARY

Embodiments according to the present disclosure provide a number of advantages. For example, embodiments according to the present disclosure enable the integration of an automatic emergency braking feature in manual transmission applications using clutch-by-wire technology.

In one aspect, a method for automatic braking for vehicles having a manual transmission is disclosed. The method includes the steps of providing a vehicle with at least one vehicle sensor configured to measure at least one vehicle characteristic, at least one actuator configured to control a vehicle braking system and a vehicle shifting system, and a controller in communication with the at least one vehicle sensor and the at least one actuator, determining, by the controller, a vehicle speed and an engine speed, receiving, by the controller, sensor data from the at least one vehicle sensor, calculating, by the controller, if the vehicle speed should be reduced based on the sensor data from the at least one vehicle sensor, generating, by the controller, a first control signal if the vehicle speed should be reduced, automatically controlling, by the controller, the at least one actuator based on the first control signal, calculating, by the controller, if the engine speed is below a predetermined idle speed, generating, by the controller, a second control signal if the engine speed is below the predetermined idle speed, and automatically controlling, by the controller, the at least one actuator based on the second control signal.

In some aspects, the method further includes the step of monitoring, by the controller, the vehicle speed and the engine speed. In some aspects, the method further includes the steps of determining, by the controller, an optimal gear based on the engine speed and generating, by the controller, a notification to a user instructing the user to shift the manual transmission to an optimal gear. In some aspects, the method further includes the step of generating, by the controller, a notification to a user instructing the user to shift the manual transmission to a first gear.

In some aspects, the first control signal is a braking control signal. In some aspects, the second control signal a shifting control signal.

In another aspect, an automotive vehicle includes a vehicle braking system and a vehicle shifting system, at least one vehicle performance sensor and at least one vehicle environment sensor, at least one actuator configured to control the vehicle braking system and the vehicle shifting system, and a controller in communication with the at least one performance vehicle sensor, the at least one vehicle environment sensor, and the at least one actuator, the controller configured to receive first sensor data corresponding to a vehicle characteristic from the at least one vehicle performance sensor, receive second sensor data corresponding to a physical environment of the vehicle from the at least one vehicle environment sensor, determine a braking control signal based on the first and second sensor data, determine a clutch control signal based on the first sensor data, and automatically control the at least one actuator according to the braking and clutch control signals.

In some aspects, the at least one vehicle environment sensor includes at least one of the group including an optical camera, a RADAR sensor, a LIDAR sensor, a thermal camera, and an ultrasonic sensor. In some aspects, the at least one vehicle performance sensor includes at least one of the group including a vehicle speed sensor, a pedal force sensor, a gear position sensor, and an engine speed sensor. In some aspects, the vehicle characteristic includes one or more of a vehicle speed and an engine speed.

In some aspects, the controller is further configured to monitor one or more of the vehicle speed and the engine speed. In some aspects, the first sensor data includes data from one or more of a vehicle speed sensor and an engine speed sensor. In some aspects, the second sensor data includes data from one or more of a GPS sensor, a RADAR sensor, a LIDAR sensor, an optical camera, a thermal camera, and an ultrasonic sensor.

In yet another aspect, a system for automatic braking for manual transmission vehicles includes a vehicle sensor configured to measure a vehicle characteristic, a transmission system including at least two gears, at least one clutch, and a clutch actuator, and a controller in communication with the vehicle sensor and the transmission system. The controller is configured to determine a vehicle speed and an engine speed, determine if the vehicle speed should be reduced and if so, generate a first control signal based on the vehicle speed determination and automatically control vehicle braking levels based on the first control signal, and determine if the engine speed is below a predetermined threshold and if so, generate a second control signal based on the engine speed and automatically control the clutch actuator based on the determined engine speed.

In some aspects, the controller is further configured to monitor the vehicle speed and the engine speed. In some aspects, the predetermined threshold is a predetermined engine idle speed. In some aspects, the controller is further configured to prompt the user to shift to a lower gear if the vehicle speed is non-zero and prompt the user to shift to first gear if the vehicle speed is zero.

BRIEF DESCRIPTION OF THE DRAWINGS

The present disclosure will be described in conjunction with the following figures, wherein like numerals denote like elements.

Figure 1:
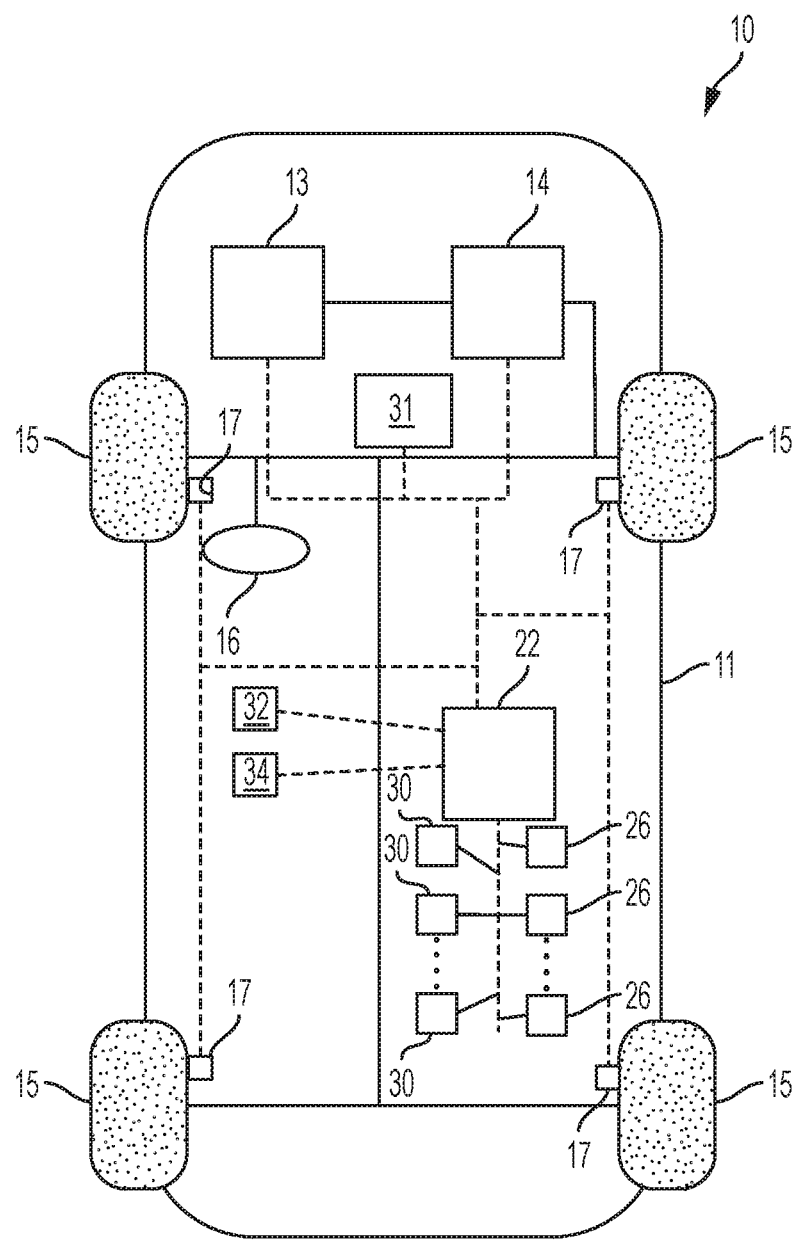
FIG. 1 is a schematic diagram of a vehicle having an automatic braking system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Vehicles equipped with automatic braking systems provide safety benefits in many scenarios, including those involving hard braking operations to avoid a detected obstacle. However, for manual transmission vehicles, a vehicle speed reduction resulting from a hard braking operation, or operation at low engine speed in a high transmission gear, may result in engine stall as the engine speed slows. Additionally, engine lugging, which occurs when a high load is placed on the engine when the engine is at a low engine speed, can result in damage to engine components as well as undesirable performance. To address possible damage and undesirable performance and provide the safety benefit of automatic braking, in some embodiments, a manual transmission vehicle includes an electronic or clutch-by-wire system as part of the transmission system and a controller configured to monitor vehicle and engine speed and generate control signals to apply vehicle braking and disengage or open the clutch when the engine speed decreases below a predetermined threshold. Additionally, in some embodiments, the controller is also configured to prompt the user to shift the vehicle to a lower or optimal gear once the automatic braking event is concluded. Additionally, in some embodiments, the controller is also configured to monitor the selected gear position of the transmission as selected by the vehicle operator.

FIG. 1 schematically illustrates an automotive vehicle 10 according to the present disclosure. The vehicle 10 generally includes a body 11 and wheels 15. The body 11 encloses the other components of the vehicle 10. The wheels 15 are each rotationally coupled to the body 11 near a respective corner of the body 11. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 includes a propulsion system 13, which may in various embodiments include an internal combustion engine, an electric machine such as a traction motor, and/or a fuel cell propulsion system. The vehicle 10 also includes a transmission system 14 configured to transmit power from the propulsion system 13 to the vehicle wheels according to selectable gear ratios. According to various embodiments, the transmission system 14 may include a manual transmission or other appropriate transmission. The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 10 additionally includes a steering system 16. While depicted as including a steering wheel and steering column for illustrative purposes, in some embodiments, the steering system 16 may not include a steering wheel.

The vehicle 10 also includes a plurality of sensors 26 configured to measure and capture data on one or more vehicle characteristics, including but not limited to vehicle speed, vehicle acceleration, vehicle deceleration, transmission gear position, steering angle, and vehicle heading. In the illustrated embodiment, the sensors 26 include, but are not limited to, an accelerometer, a speed sensor, a heading sensor, gyroscope, steering angle sensor, or other sensors that sense observable conditions of the vehicle or the environment surrounding the vehicle and may include additional sensors as appropriate. The vehicle 10 also includes a user input device such as a pedal having a pedal sensor 32. The pedal sensor 32 is configured to measure and capture data on a pedal position, such as a clutch pedal. In some embodiments, the pedal sensor 32 is a potentiometer. Another user input device such as a gear selector 34 is also enclosed by the vehicle 10. The gear selector 34 includes a gear absolute position sensor which informs the controller of the selected gear as input by the operator using the gear selector/shifter 34. The gear selector 34 is configured to provide user input regarding the transmission gear selected by the user during operation of the vehicle 10. As discussed below, the input from the plurality of sensors 26, the pedal sensor 32, and the gear selector 34 is received by a controller 22 for processing.

The vehicle 10 includes at least one controller 22. The propulsion system 13, transmission 14, steering system 16, and wheel brakes 17 are in communication with or under the control of the controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The vehicle 10 also includes a display 31 electrically connected to the controller 22. The display 31 is used, in some embodiments, to display messages, prompts, notices, or reminders generated by the controller 22. In some embodiments, the prompts, notices and reminders include, but are not limited to, prompts to shift the transmission of the vehicle 10 into an optimal gear via the gear selector 34 or messages or notifications regarding detected obstacles in a projected path of the vehicle 10.

Figure 2:
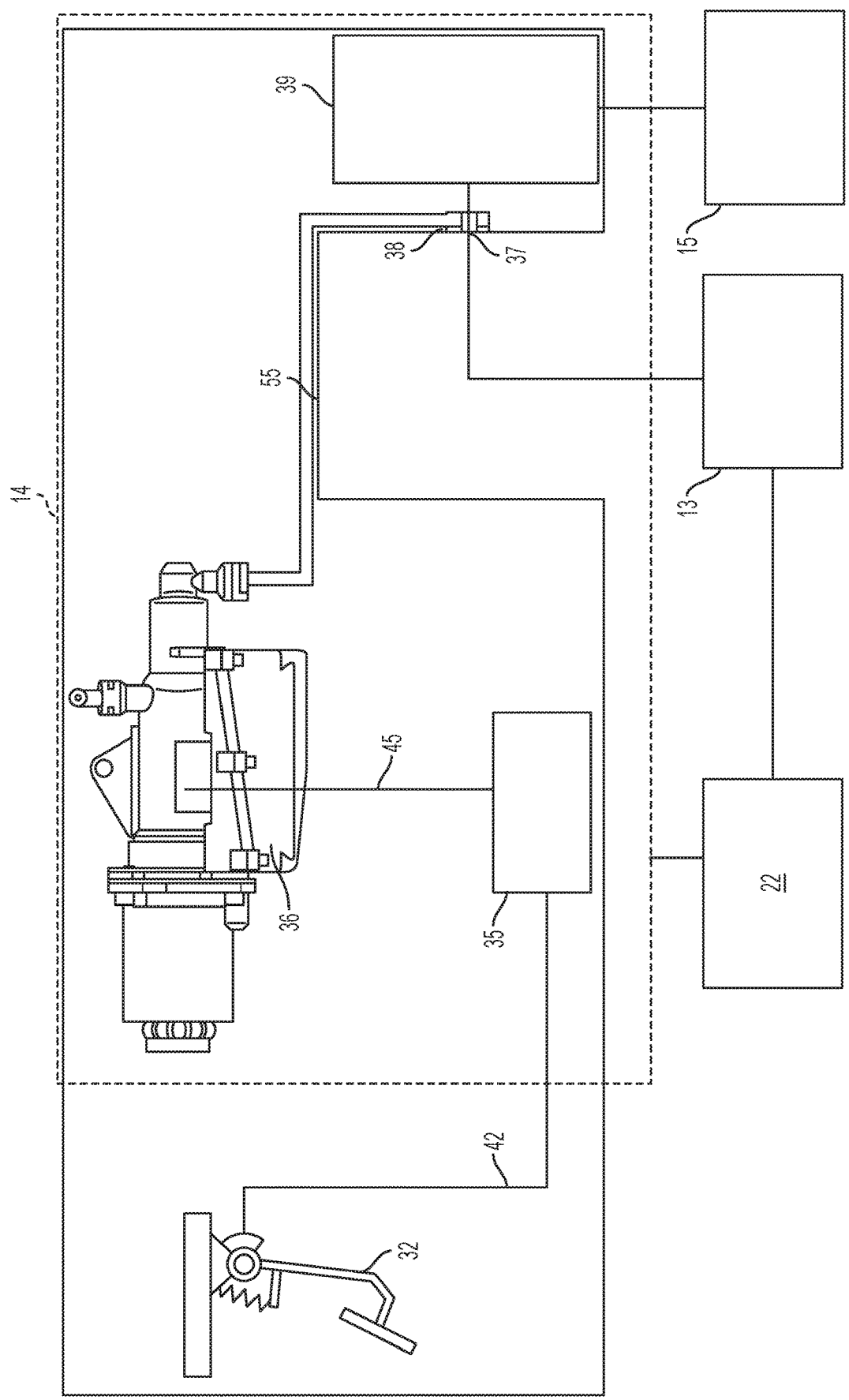
FIG. 2 is a schematic diagram of a transmission system of a vehicle, such as the vehicle in FIG. 1, according to an embodiment.

FIG. 2 is a schematic block diagram of the transmission system 14 and the interaction of the transmission system 14 with the propulsion system 13 and the controller 22. The transmission system 14 includes a clutch control module (CCM) 35 that is electrically connected to the pedal sensor 32. The transmission system 14 also includes a clutch actuator 36, and a clutch 37 operated by a concentric slave cylinder (CSC) 38. The clutch 37 and the CSC 38, along with a gearbox and drivetrain 39 of the transmission system 14, control the transmission of power from the propulsion system 13 to the vehicle wheels 15.

The pedal sensor 32 measures and captures data regarding user-applied pedal force. The CCM 35 receives pedal force data 42 acquired by the pedal sensor 32. Based on the pedal force data 42, and other data received by the controller 22 from the sensors 26, as well as any control signals generated by the controller 22, the CCM 35 calculates how and when to engage or disengage one or more clutches of the transmission system 14. The CCM 35 generates a control signal 45 that is received by the clutch actuator 36. The clutch actuator 36 receives the control signal 45 and controls one or more of the clutches of the transmission system 14, including, for example, the clutch 37 via the concentric slave cylinder (CSC) 38. The CSC 38 includes release bearings that enable a lighter clutch pedal effort. In some embodiments, the clutch actuator 36 controls a hydraulic line 55 connected to the CSC 38.

Figure 3:
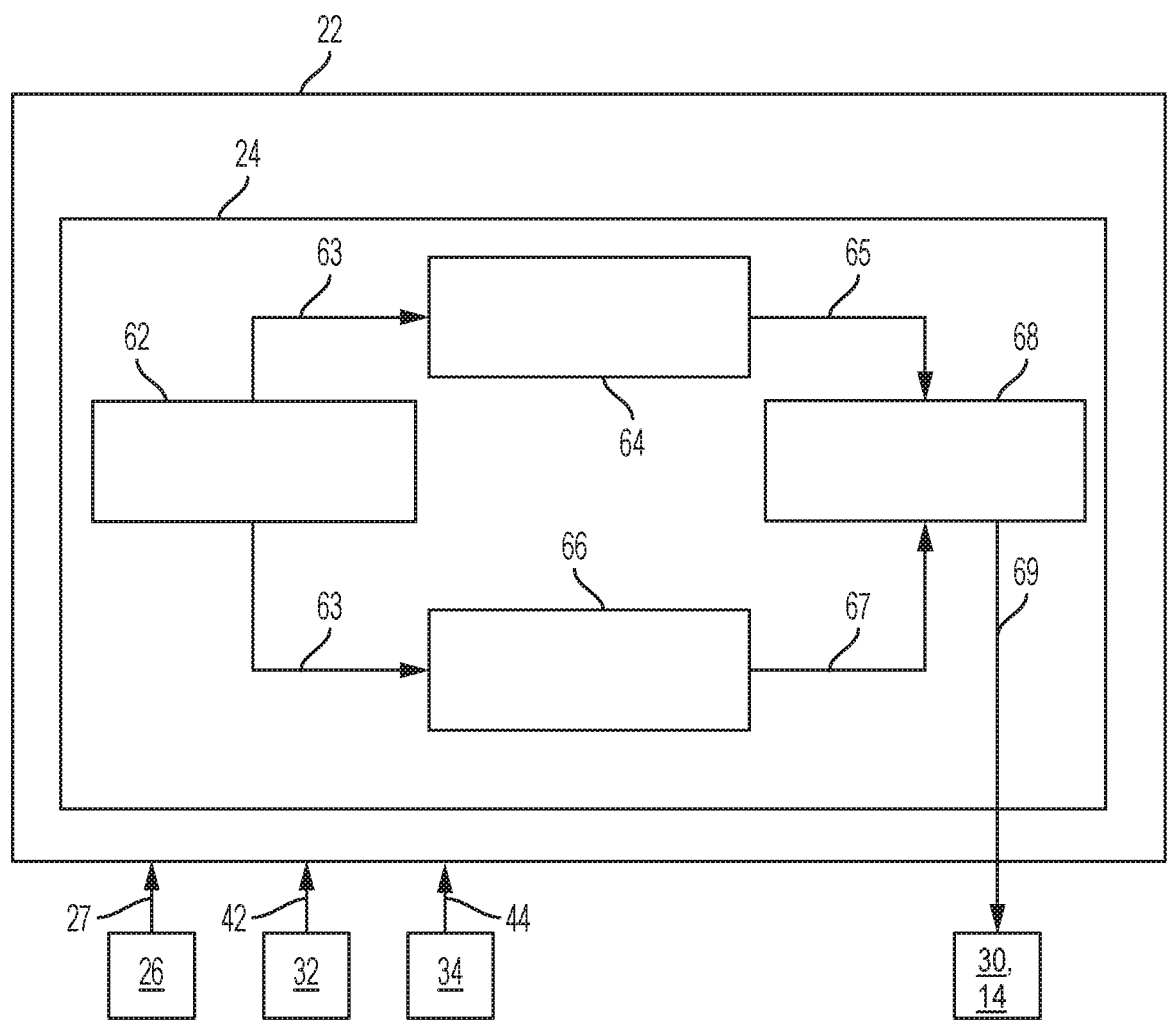
FIG. 3 is a block diagram of a controller for a vehicle, such as the vehicle of FIG. 1, according to an embodiment.

FIG. 3 schematically illustrates the controller 22 of the vehicle 10. The controller 22 includes an automated driving assistance system (ADAS) 24 for automatically controlling various actuators in the vehicle. In an exemplary embodiment, the ADAS 24 is configured to control the propulsion system 13, transmission system 14, steering system 16, and wheel brakes 17 to control vehicle acceleration, steering, and braking, respectively, without human intervention via a plurality of actuators 30 in response to inputs from the plurality of sensors 26, which may include GPS, RADAR, LIDAR, optical cameras, thermal cameras, ultrasonic sensors, and/or additional sensors as appropriate, as well as the pedal sensor 32 and the gear selector 34.

As shown in FIG. 3, the ADAS 24 includes multiple distinct control systems, including a sensor fusion and preprocessing module 62 that processes and synthesizes sensor data 27 from the variety of sensors 26, pedal sensor data 42 from the clutch pedal sensor 32, and user input data 44 from the gear selector 34. The sensor fusion and preprocessing module 62 performs calibration of the sensor data 27, the pedal sensor data 42, and the user input data 44 and outputs preprocessed sensor output 63. The sensor output 63 includes various calculated parameters including, but not limited to vehicle speed, engine speed, a location of a detected obstacle relative to the vehicle, and a predicted path of the detected obstacle relative to the vehicle.

The ADAS 24 also includes a vehicle speed monitoring module 64 for monitoring the speed of the vehicle in relation to the location of detected obstacles in the vicinity of the vehicle 10. The vehicle speed monitoring module 64 is configured to receive the preprocessed sensor output 63, including data regarding the current vehicle speed. The vehicle speed monitoring module 64 processes and analyzes the preprocessed sensor output 63 and generates a vehicle speed monitor output 65. The vehicle speed monitor output 65 includes various calculated parameters including, but not limited to, a comparison of the current vehicle speed relative to the location of detected obstacles in the vicinity of the vehicle 10 and a determination of whether vehicle braking should be applied to reduce the vehicle speed to avoid a collision with the detected obstacle.

The ADAS 24 also includes an engine speed monitoring module 66 for monitoring the engine speed of the vehicle 10. The engine speed monitoring module 66 is configured to receive the preprocessed sensor output 63, including data regarding the current engine speed. The engine speed monitoring module 66 processes and analyzes the preprocessed sensor output 63 and generates an engine speed monitor output 67. The engine speed monitor output 67 includes various calculated parameters including, but not limited to, a comparison of the current engine speed relative to a predetermined engine idle speed and a determination of whether the clutch 37 should be opened to reduce driveline excitation.

The ADAS 24 additionally includes a control module 68 for issuing control commands to vehicle actuators. The control module 68 is configured to receive and process the vehicle speed monitor output 65 and the engine speed monitor output 67 and generate a vehicle control output 69. The vehicle control output 69 includes a set of actuator commands to achieve automatic braking and electronic clutch actuation as determined by the vehicle speed monitoring module 64 and the engine speed monitoring module 66, including but not limited to a steering command, a throttle command, and a brake command.

The vehicle control output 69 is communicated to the actuators 30 and the transmission system 14. The actuators 30 and the transmission system 14 receive control signals from the control module 68 to control steering, braking, throttle, clutch or shifting, or other aspects of the vehicle 10. In some embodiments, the actuators 30 include a steering control, a throttle control, and a brake control. The steering control may, for example, control the steering system 16 of the vehicle 10. The throttle control may, for example, control the propulsion system 13 of the vehicle 10. The brake control may, for example, control wheel brakes 17 of the wheels 15 of the vehicle 10. The clutch control may, for example, be generated by the CCM 35 to control the clutch actuator 36, the clutch 37, and the CSC 38 of the transmission system 14 of the vehicle 10.

To address safety concerns, for example, when a vehicle approaches a detected obstacle without the controller of the vehicle detecting a reduction in vehicle speed, such as when the operator has not applied the brakes, the controller can initiate vehicle braking by issuing a braking control signal to one or more actuators connected to the wheel brakes. In these scenarios, automatic braking occurs to slow the vehicle prior to a possible collision with the detected obstacle. However, for manual transmission vehicles, automatically braking the vehicle may result in engine stall or engine lugging conditions. These conditions are undesirable to the operator and may also result in damage to the engine or propulsion system.

Figure 4:
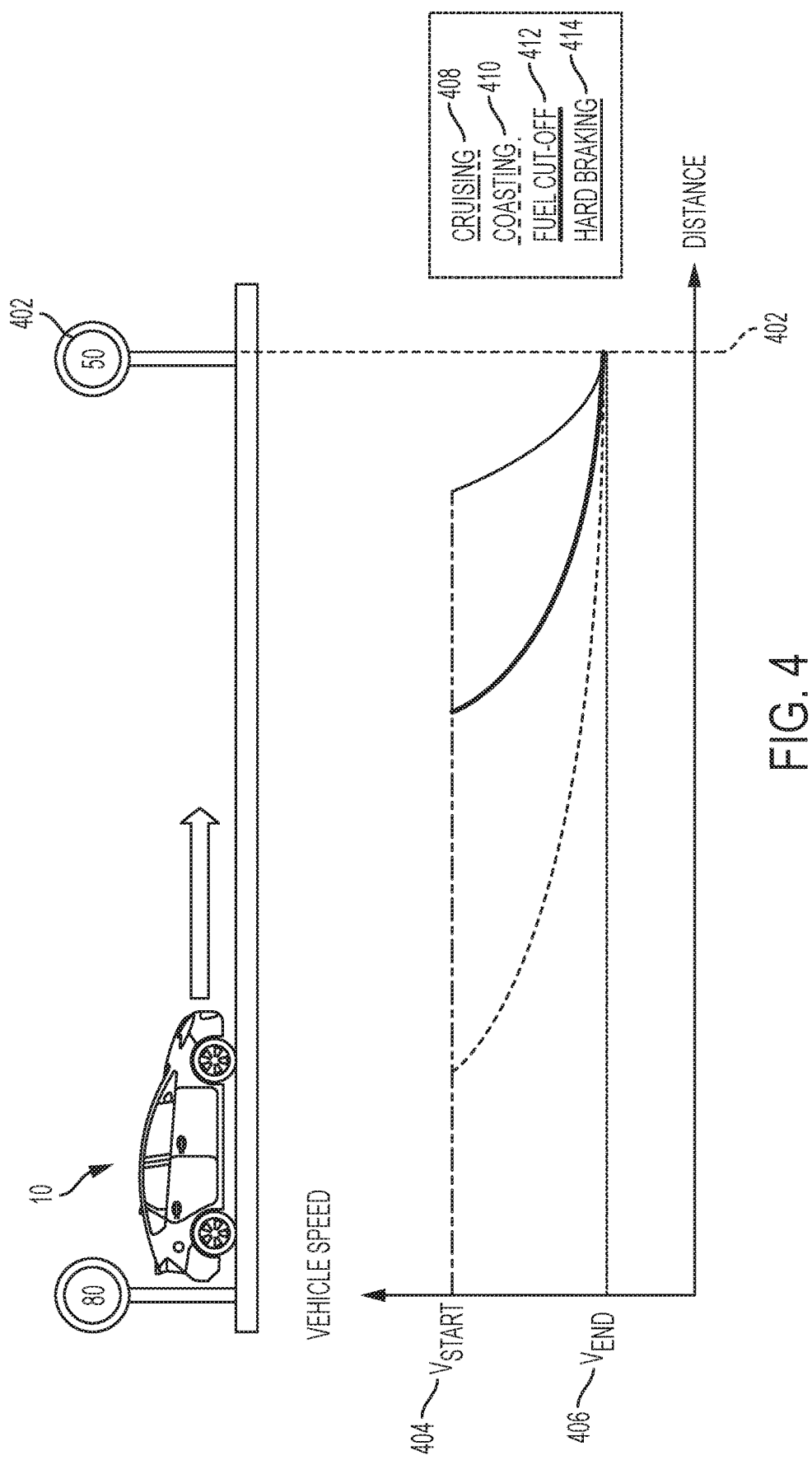
FIG. 4 is a schematic and graphical illustration of a deceleration event of a vehicle, such as the vehicle of FIG. 1, according to an embodiment.

FIG. 4 illustrates vehicle speed as a function of distance from a detected obstacle or other condition that initiates a reduction in vehicle speed. As the vehicle 10 approaches a speed reduction target 402, the speed of the vehicle 10 changes from an initial vehicle speed, $V_{start}$ 404, to a final vehicle speed, $V_{end}$ 406. The reduction in vehicle speed from a cruising speed, illustrated by line 408, can occur gradually via coasting, illustrated by line 410, or fuel cut off, illustrated by line 412. In other scenarios, the reduction in vehicle speed happens more suddenly, such as a change from the cruising speed, illustrated by line 408, to the final vehicle speed 406 via a hard braking speed reduction, illustrated by line 414. However, for manual transmission vehicles, such as vehicle 10, a vehicle speed reduction from a hard braking operation may result in engine stall or engine lugging as the engine speed slows. To address these undesirable scenarios and provide the safety benefit of automatic braking, in some embodiments, a manual transmission vehicle, such as the vehicle 10, includes a controller, such as controller 22, configured to monitor vehicle and engine speed and generate control signals to apply vehicle braking and disengage or open the clutch when the engine speed decreases below a predetermined threshold.

Figure 5:
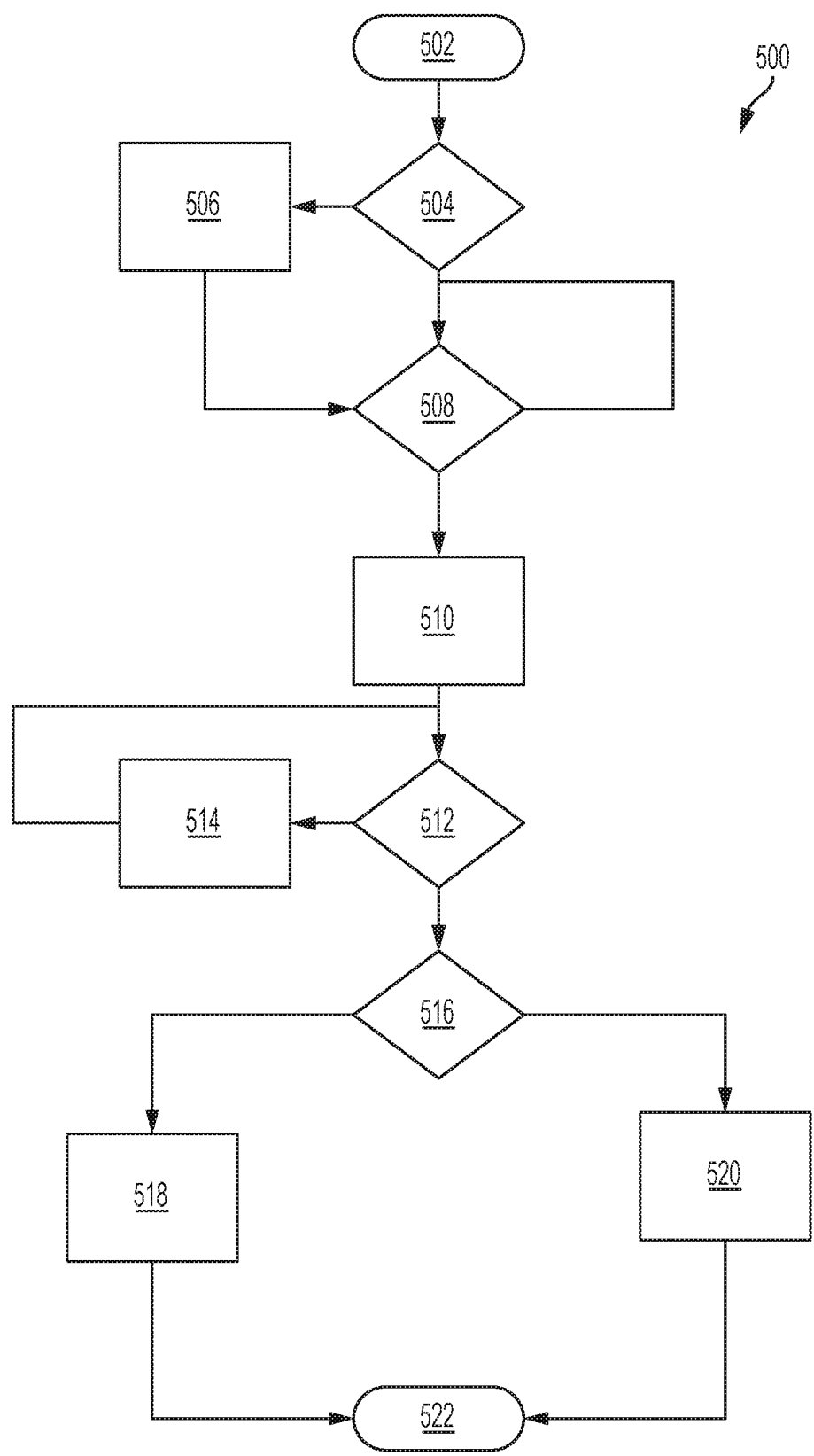
FIG. 5 is a flow chart of a method for automatic braking for manual transmission vehicles, according to an embodiment.

FIG. 5 is a flow chart of a method 500 to enable an active safety feature, such as automatic braking, in manual transmission applications without stalling the engine as the vehicle slows or comes to a stop. The method 500 can be used in scenarios when braking is applied by the operator or when an active safety feature, such as a lane departure warning or forward collision alert, is activated. The method 500 can be utilized in connection with the vehicle 10, the controller 22, the transmission system 14, and the various modules of the ADAS 24, in accordance with exemplary embodiments. The order of operation within the method 500 is not limited to the sequential execution illustrated in FIG. 5, but may be performed in one or more varying orders as applicable and in accordance with the present disclosure.

As shown in FIG. 5, starting at 502, the method 500 proceeds to 504. At 504, the controller 22 determines whether a reduction in vehicle speed is desirable. The determination of whether to reduce the vehicle speed is made, in some embodiments, by the vehicle speed monitoring module 64 of the controller 22 based on the sensor data 27 provided by one or more of the sensors 26 and the detection of an obstacle in the projected path of the vehicle 10. If the controller 22 determines that a reduction in vehicle speed should occur, the method 500 proceeds to 506. At 506, the control module 68 of the controller 22 generates a control signal that is communicated to the plurality of actuators 30 to control vehicle braking via the wheel brakes 17. The method 500 proceeds to 508.

However, if at 504 the controller 22 determines that the vehicle speed should not be reduced, or reduced further, the method 500 also proceeds to 508. At 508, the engine speed monitoring module 66 of the controller 22 determines whether the engine speed is below a predetermined threshold, for example, a predetermined engine idle speed. In some embodiments, the predetermined engine idle speed is based on the size and type of engine, the current vehicle speed, and the transmission gear selected. In some embodiments, the engine idle speed is between 600 rpm and 1,000 rpm.

If the engine speed monitoring module 66 determines that the engine speed is not below the predetermined idle speed, the controller 22 continues to monitor the engine speed until the engine speed falls below the predetermined threshold. Once the engine speed reaches or falls below the predetermined idle speed, the method 500 proceeds to 510. At 510, the control module 68 of the controller 22 generates a control signal that is communicated to the CCM 35 of the transmission system 14. The CCM 35 generates a clutch control signal that is transmitted to the clutch actuator 36 to control the clutch 37 and the CSC 38. The clutch control signal commands the clutch actuator 36 to open or release the clutch 37 to reduce driveline excitation to prevent engine lugging and a potential engine stall condition.

Next, at 512, the controller 22 determines whether vehicle braking is still required, that is, if the vehicle speed should be further reduced to avoid, for example, a detected obstacle. If the controller 22 determines that vehicle braking is still desired, the method 500 proceeds to 514 and, as discussed above with respect to step 506, the control module 68 of the controller 22 generates a control signal that is communicated to the plurality of actuators 30 to control vehicle braking via the wheel brakes 17. The method 500 then returns to 512 to continue monitoring the vehicle speed with respect to any detected obstacles to determine if the vehicle speed should be further reduced.

However, if the vehicle speed does not need to be further reduced, if, for example, the vehicle speed is zero or the controller 22 determines that a potential collision is unlikely, the method 500 proceeds to 516. At 516, the current vehicle speed is determined and monitored by the vehicle speed monitoring module 64. If the current vehicle speed is non-zero and no further braking is desired, the method 500 proceeds to 518. At 518, the controller 22 generates a prompt that is displayed to the vehicle operator via the vehicle display 31, such as a heads-up display, an infotainment screen, etc. In some embodiments, the prompt informs the vehicle operator to shift to a lower gear. In some embodiments, the prompt informs the vehicle operator to shift to an optimal gear based on a shift indicator calculation performed by the controller 22 using sensor data from the plurality of sensors 26. In some embodiments, the prompt is a visual cue to the operator. In some embodiments, the prompt is an auditory cue to the operator. In some embodiments, the prompt includes both visual and auditory cues for the operator. The method 500 then proceeds to 522 and ends.

If the current vehicle speed is zero and no further braking is desired, the method 500 proceeds to 520. At 520, the controller 22 generates a prompt that is displayed to the vehicle operator via the vehicle display 31. In some embodiments, the prompt informs the vehicle operator to shift to first gear and launch the vehicle 10. Alternatively, in some embodiments for electronic clutch systems that support creep launch, the prompt informs the vehicle operator to shift to first gear and the vehicle 10 creeps forward when the brake pedal is released. The method 500 then proceeds to 522 and ends.

In some embodiments, the gear selector 34 provides input to the controller 22 regarding the transmission gear position selected by the operator. Since the controller 22 receives information on the selected transmission gear position, if the gear selector 34 is placed into neutral by the operator and heavy braking is applied, either by the operator or in an automatic braking situation, it is not necessary to open the clutch as discussed above, as the vehicle will not stall. However, the methods discussed above to prevent engine stall may be used in other scenarios, such as during an operator- or controller-initiated heavy braking event when the transmission gear selector is not in neutral.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skid in the art, may occur in amounts that do not preclude the effect the characteristic was intended to provide.

Numerical data may be expressed or presented herein in a range format, it is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for automatic braking for a vehicle having a manual transmission, the method comprising:
    providing the vehicle with at least one vehicle sensor configured to measure at least one vehicle characteristic, at least one actuator configured to control a vehicle braking system and a vehicle shifting system, and a controller in communication with the at least one vehicle sensor and the at least one actuator;
    determining, by the controller, a vehicle speed and an engine speed;
    receiving, by the controller, sensor data from the at least one vehicle sensor;
    determining, by the controller, based on the sensor data from the at least one vehicle sensor, when automatic braking of the vehicle is required to reduce the vehicle speed;
    when the controller determines that automatic braking of the vehicle is required to reduce the vehicle speed, generating, by the controller, a first control signal;
    automatically controlling, by the controller, the at least one actuator based on the first control signal;
    determining, by the controller, when the engine speed is below a predetermined idle speed;
    when the engine speed is below the predetermined idle speed, generating, by the controller, a second control signal; and
    automatically controlling, by the controller, the at least one actuator based on the second control signal.

2. The method of claim 1, further comprising monitoring, by the controller, the vehicle speed and the engine speed.

3. The method of claim 1, further comprising determining, by the controller, an optimal gear based on the engine speed and generating, by the controller, a notification to a user instructing the user to shift the manual transmission to an optimal gear.

4. The method of claim 1, further comprising generating, by the controller, a notification to a user instructing the user to shift the manual transmission to a first gear.

5. The method of claim 1, wherein the first control signal is a braking control signal.

6. The method of claim 1, wherein the second control signal is a shifting control signal.

7. An automotive vehicle, comprising:
    a vehicle braking system and a vehicle shifting system;
    at least one vehicle performance sensor and at least one vehicle environment sensor;
    at least one actuator configured to control the vehicle braking system and the vehicle shifting system; and
    a controller in communication with the at least one vehicle performance sensor, the at least one vehicle environment sensor, and the at least one actuator, the controller configured to receive first sensor data corresponding to a vehicle characteristic from the at least one vehicle performance sensor, receive second sensor data corresponding to a physical environment of the vehicle from the at least one vehicle environment sensor, determine a braking control signal based on the first and second sensor data, determine a clutch control signal based on the first sensor data, and automatically control the at least one actuator according to the braking and clutch control signals.

8. The automotive vehicle of claim 7, wherein the at least one vehicle environment sensor comprises at least one of the group including an optical camera, a RADAR sensor, a LIDAR sensor, a thermal camera, and an ultrasonic sensor.

9. The automotive vehicle of claim 7, wherein the at least one vehicle performance sensor comprises at least one of the group including a vehicle speed sensor, a pedal force sensor, and an engine speed sensor.

10. The automotive vehicle of claim 7, wherein the vehicle characteristic comprises one or more of a vehicle speed and an engine speed.

11. The automotive vehicle of claim 10, wherein the controller is further configured to monitor one or more of the vehicle speed and the engine speed.

12. The automotive vehicle of claim 7, wherein the first sensor data includes data from one or more of a vehicle speed sensor and an engine speed sensor.

13. The automotive vehicle of claim 12, wherein the second sensor data includes data from one or more of a GPS sensor, a RADAR sensor, a LIDAR sensor, an optical camera, a thermal camera, and an ultrasonic sensor.

14. A system for automatic braking for a manual transmission vehicle, comprising:
    a vehicle sensor configured to measure a vehicle characteristic;
    a transmission system comprising at least two gears, at least one clutch, and a clutch actuator; and
    a controller in communication with the vehicle sensor and the transmission system, the controller configured to
        determine a vehicle speed and an engine speed;
        determine, based on the vehicle speed, when automatic braking of the manual transmission vehicle is required and when required, generate a first control signal based on the vehicle speed determination and automatically control vehicle braking levels based on the first control signal; and
        determine, based on the engine speed, whether the engine speed is below a predetermined threshold and when the engine speed is below the predetermined threshold, generate a second control signal based on the engine speed and automatically control the clutch actuator based on the determined engine speed.

15. The system of claim 14, wherein the controller is further configured to monitor the vehicle speed and the engine speed.

16. The system of claim 14, wherein the predetermined threshold is a predetermined engine idle speed.

17. The system of claim 14, wherein the controller is further configured to prompt a user to shift to a lower gear of the at least two gears when the vehicle speed is non-zero and prompt the user to shift to a first gear of the at least two gears when the vehicle speed is zero.

* * * * *